April 10, 1956 W. V. EDWARDS, SR., ET AL 2,741,257
GAS VALVE
Filed Aug. 10, 1953 2 Sheets-Sheet 1

William V. Edwards, Sr.
William V. Edwards, Jr.
INVENTORS.

BY Clarence A. O'Brien
and Harvey B. Jackson
Attorneys

April 10, 1956 W. V. EDWARDS, SR., ET AL 2,741,257
GAS VALVE
Filed Aug. 10, 1953 2 Sheets-Sheet 2

William V. Edwards, Sr.
William V. Edwards, Jr.
INVENTORS.

United States Patent Office 2,741,257
Patented Apr. 10, 1956

2,741,257

GAS VALVE

William V. Edwards, Sr., Buena Vista, Colo., and William V. Edwards, Jr., Amarillo, Tex.

Application August 10, 1953, Serial No. 373,294

6 Claims. (Cl. 137—113)

This invention relates in general to improvements in valve construction, and more specifically to a change-over valve for a gas supply line.

The primary object of this invention is to provide an improved change-over valve which may be conveniently mounted between a pair of compressed gas sources and a gas supply line, the change-over valve being controlled by a reduction in pressure in one of the gas sources whereby the other of the gas sources is automatically communicated with the gas supply line.

Another object of this invention is to provide an improved change-over valve for gas containers connected to a single gas supply line, the change-over valve including valve means actuated by fluid cylinders, the fluid cylinders being actuated in response to a reduction in pressure of a gas inlet line connected to the gas supply line.

Another object of this invention is to provide an improved actuating means for valve means of a gas change-over valve, the actuating means including a toggle member which is spring urged to off-center positions, the spring urging the toggle member being utilized for the shifting of the valve means.

Another object of this invention is to provide an improved change-over gas valve which may be quickly and easily attached between a pair of gas bottles and a gas supply line.

A further object of this invention is to provide an improved connection between a pivoted member and means for pivoting the same, the connection including means for adjusting the effective lever arm of linkage connecting the pivoted member and the means for pivoting the same.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
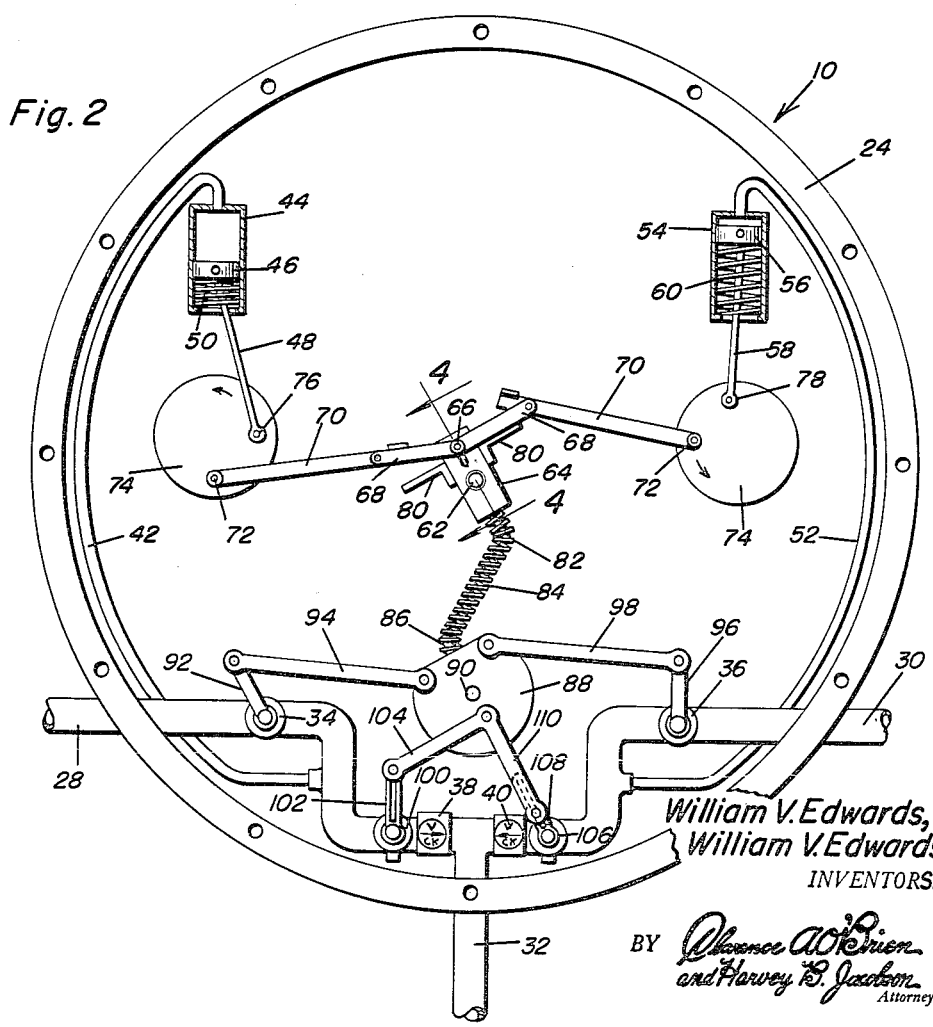
Figure 2 is an enlarged front elevational view of the change-over gas valve in Figure 1, and shows the same with the front cover thereof removed, the general construction of the gas change-over valve being clearly illustrated.
Figure 3:
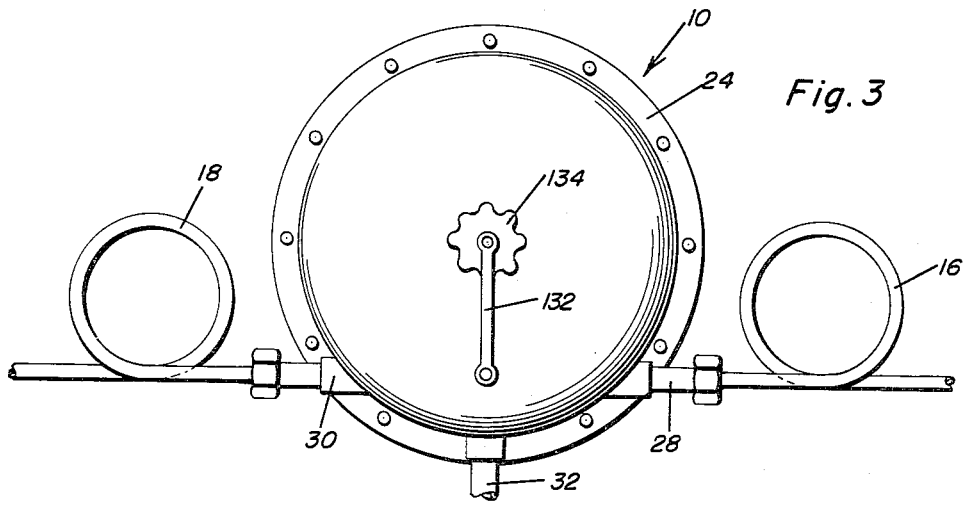
Figure 3 is a rear elevational view of the gas valve of Figure 1 on a slightly larger scale and shows the means for controlling the effective lever arm of means for pivoting a pivoted member thereof.
Figure 4:
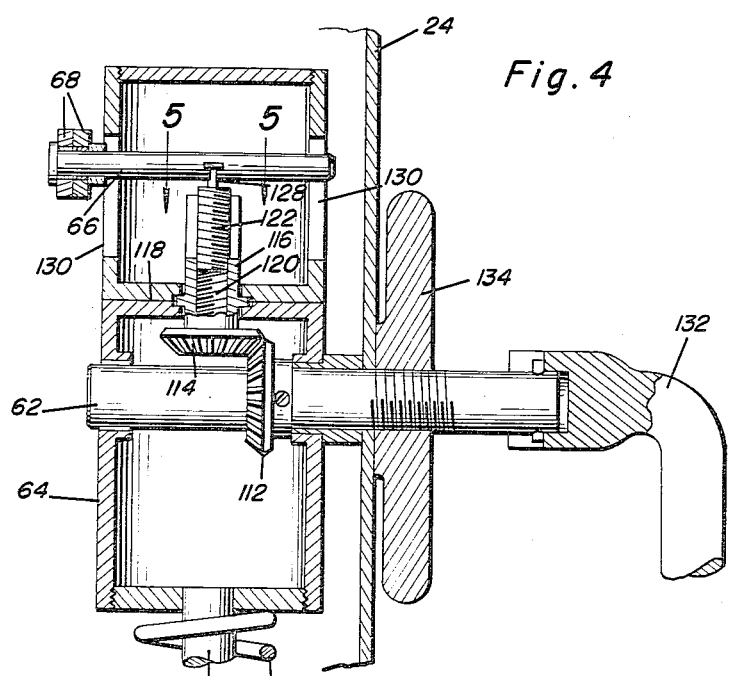
Figure 5:
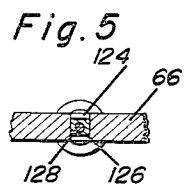

Figure 4 is an enlarged fragmentary sectional view taken substantially upon the plane indicated by the section line 4—4 of Figure 2 and shows the manner in which a connecting pin is moved relative to a shaft on which a pivoted member is mounted whereby the effective lever arm of linkage connected to the pin may be selectively varied; and Figure 5 is a fragmentary sectional view taken substantially upon the plane indicated by the section line 5—5 of Figure 4 and shows the manner in which the pin is connected to a support member.

Figure 1:
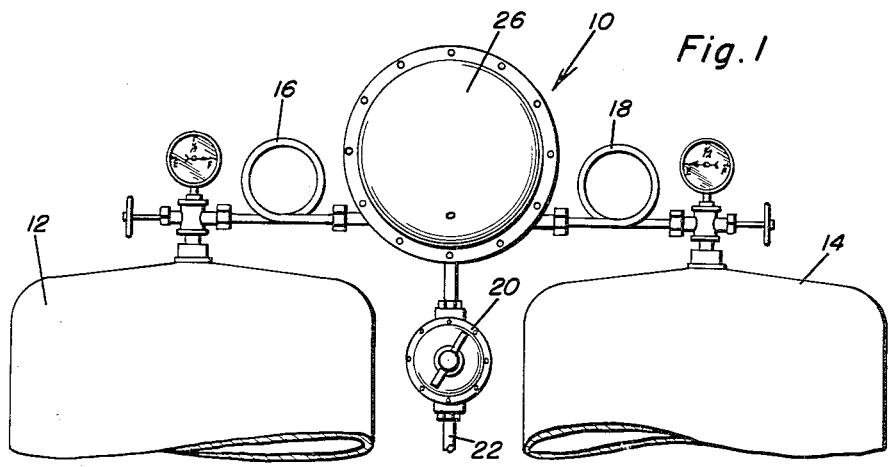
Figure 1 is an elevational view of the change-over gas valve which is the subject of this invention and shows the same in position relative to a pair of gas bottles and a gas supply line, only the upper portions of the gas bottles being illustrated.

Referring now to Figure 1 in particular, it will be seen that there is illustrated the change-over gas valve which is the subject of this invention, the gas valve being referred to in general by the reference numeral 10. The gas valve 10 is connected to a gas bottle 12 and a gas bottle 14 by gas lines 16 and 18, respectively. A gas valve 10 is also connected to a pressure regulator 20 which is in turn connected to a gas supply line 22.

It will be understood that the main purpose of this invention is to provide a suitable gas valve which will permit the connection of a pair of gas bottles, such as the gas bottles 12 and 14 to a gas supply line, such as the gas supply line 22. When the gas bottles are first connected to the gas supply line 22, only one of the bottles is communicated with the gas supply line. As the pressure decreases in the gas bottle 12 and it becomes substantially empty, it is desired that the gas bottle 12 then trip mechanism whereby the linkage of the gas valve 10, to be explained in more detail hereinafter, disconnects the first gas bottle from the gas supply line 22 and connects the second gas bottle thereto.

Referring now to Figure 2 in particular, it will be seen that the gas valve 10 includes a housing 24 which has a removable front cover 26, the front cover being removed in Figure 2. Originally mounted within the housing 24 and projecting outwardly therethrough is a first gas inlet line 28 and a second gas inlet line 30. The gas inlet lines 28 and 30 are connected to a gas supply line 32. It will be understood that the gas inlet lines 28 and 30 and the gas supply line 32 are connected to the gas lines 16 and 18 and the gas regulator 20 respectively.

Passage of gas through the gas inlet line 28 into the gas supply line 22 is controlled by a valve 34. The gas inlet line 30 is provided with a similar valve 36. In order that passage of gas from the gas lines 28 and 30 into each other may be prevented, the gas line 28 is provided with a check valve 38 and the gas line 30 is communicated with the check valve 40.

Connected to the gas inlet line 28 intermediate the valve 34 and the check valve 38 and communicated with the interior thereof is a gas line 42. The gas line 42 has its opposite end thereof connected to and communicated with the interior of a cylinder 44. It will be noted that the gas line 42 communicates with the upper end of the cylinder 44 and that mounted within the cylinder 44 for a vertical reciprocatory movement is a piston 46. The piston 46 has connected thereto and passing out through the lower end of the cylinder 44 a connecting rod 48. Mounted within the cylinder 44 below the piston 46 and urging the same upwardly is a coil spring 50.

The gas inlet line 30 has connected thereto intermediate the valve 36 and the check valve 40 and communicating therewith a gas line 52. The gas line 52 has its opposite end thereof connected to an upper end and communicating with the interior of a cylinder 54. Mounted within the cylinder 54 for vertical reciprocatory movement is a piston 56 which has a depending piston rod 58. The piston 56, like the piston 46, is urged upwardly by a coil spring disposed within the cylinder 54 below the piston, the coil spring being referred to by the reference numeral 60.

Disposed substantially at the center of the housing 24 and pivotally mounted on a transverse shaft 62 is a tubular pivot member 64. The pivot member 64 is provided adjacent its upper end with a connecting pin 66 which has connected thereto on opposite sides of the pivot member 64 connecting links 68. The links 68 are in turn pivotally connected to links 70. The links 70 are connected to eccentrically mounted pins 72 of pitmans 74. The pitmans 74 are also provided with pins 76 and 78 to which are connected the piston rods 48 and 58 respectively.

Assuming the valve 34 to be opened and the valve 36 to be closed, it will be seen that the gas line 42 is under pressure and that the piston 46 is retained in a lower position against the upward urgence of the coil spring 50 due to the pressure of gas within the upper portion of the cylinder 44. As the pressure within the gas bottle 12 to which the gas inlet line 28 is connected reduces, the coil spring 50 will urge the piston 46 upwardly to cause rotation of the pitman 74 associated therewith in a counterclockwise direction. This will result in the movement of the links 68 and 70 to the right to cause pivoting of the pivoted member or toggle members 64 in a clockwise direction about the shaft 62.

Secured to the toggle member 64 on opposite sides thereof are angle members 80. The angle members 80 underlie the links 68 and cause pivoting thereof with respect to the toggle member 64. Thus when the toggle member 64 is rotated in a clockwise direction, the right hand length 68 will move out of direct alignment with its associated length 70 to effect a breaking of the combined link. This permits the left hand pitman 74 to rotate and to pivot the toggle member 64 without a similar rotation of the right hand pitman 74.

It will be noted that the bottom of the toggle member 64 is provided with a depending lug 82 on which is mounted an elongated spring 84. The elongated spring 84 has the lower end thereof mounted on a lug 86. The lug 86 is carried by a pitman 88 which is pivotally mounted on a shaft 90.

It will be noted that the valve 34 is provided with a control arm 92 which is connected to the pitman 84 by a link 94. The valve 36 is also provided with a control arm 96 which is connected with a pitman 88 by a link 93.

It will be seen that when the pitman 74 rotates to a position whereby the toggle member 64 moves over a dead center position, the spring 84 will kick with the result that the pitman 88 is snapped in a clockwise direction. This results in the simultaneous closing of the valve 34 and the opening of the valve 36. A gas enters into the gas line 52, the piston 56 is urged downwardly to cause rotation of the associated pitman 74 in a counterclockwise direction. This causes further movement of the toggle member 64 in a clockwise direction and the movement of the right hand links 68 and 70 into alignment.

In order that the piston 46 may move to its uppermost position and also to effect the complete movement of the toggle member 64 to its new position, there is provided in the gas inlet lines 68 intermediate the connection of the gas line 42 thereto and the check valve 38 a valve 100. The valve 100 is provided with a control arm 102 which is connected to the pitman 88 by a link 104. It will be understood that the valves 34 and 100 are so connected to the pitman 88 that when the valve 34 is open the valve 100 is closed and vice versa. The valve 100 is in the form of a vent valve which communicates the portion of the gas inlet valve between the valve 34 and the check valve 38 with the atmosphere. This relieves any pressure from within the upper portion of the cylinder 44 when the valve 34 is closed and permits the freedom of upward movement of the piston 46 in response to upward urgence of the spring 50.

The gas inlet line 30 is provided with a similar valve 106 intermediate its check valve 40 and the connection of the gas line 52 thereto. The valve 106 is also provided with a control arm 108 which is connected to the pitman 88 by a link 110. It will be understood that the valve 106 operates in the manner similar to that described with respect to the valve 100 in order to relieve pressure within the upper portion of the cylinder 54 at the desired time, the links 104 and 110 being integral.

Referring now to Figure 4 in particular, it will be seen that the shaft 62 is rotatably journaled in a portion of the housing 24. Carried by the shaft 62 is a first bevel gear 112 which is meshed with a second bevel gear 114 carried by a vertically extending sleeve 116. The sleeve 116 is rotatably supported by a transverse portion 118 of the toggle member 64 and is internally threaded as at 120. Threadedly engaged in the sleeve 116 is an externally threaded support member 122. The support member 122 is connected to the pin 66 and adjustably supports the same.

Referring now to Figure 5 in particular, it will be seen that the pin 66 is provided with a transverse slot 124 in which is mounted a very small plate 126. The plate 126 is non-rotatably carried by the slot 124 and is rigidly connected to a reduced upper portion 128 of the support member 122.

It will be noted that the pin 66 is mounted for vertical movement in a pair of vertically extending slots 130 in the toggle member 64. Thus it will be seen that by rotating the sleeve 116 the support member 122 may be moved vertically to also move the pin 66 vertically. Vertical movement of the pin 66 with respect to the shaft 62 varies the effective lever arm of the links 68 on the toggle member 64 so that the moment imparted to the toggle member 64 by the pistons 46 and 56 may be selectively varied. In this manner, the pressure of the gas within the gas inlet lines necessary to cause a shifting of the toggle member 64 may be selectively varied.

It will be noted that the shaft 62 extends out through the rear of the housing 24 and has removably secured thereto a crank 132. The crank 132 is used for selectively rotating the shaft 62 so that the sleeve 116 may be likewise rotated. The shaft 62 is provided with a locking collar 134 adjustably threaded thereon. It will be understood that the locking collar 134 is loosened and the shaft 62 may be then rotated by the crank 132. After the pin 66 is in the desired position, the locking collar 134 is moved toward the housing 24 and locked with respect thereto to prevent accidental rotation of the shaft 62. The crank 132 may then be removed and stored in a convenient place or such crank may be carried by the distributor of the gas bottles 12 and 14.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A gas valve for automatically switching compressed gas sources relative to a gas supply line comprising first and second gas inlet lines connected to said supply lines, valve means for controlling the flow of gas through said inlet lines, valve actuating means connected to said valve means, said valve actuating means being connected to said inlet lines and controlled by the pressure of gas within said inlet lines, said valve actuating means including a toggle member spring urged to an off-center position, fluid cylinders connected to said gas inlet lines, means connecting said fluid cylinders to said toggle member for shifting the same, a pin carried by said toggle member, means connecting said fluid cylinders to said pin, a shaft, said toggle member being pivotally mounted on said shaft, means carried by said toggle member for shifting said pin relative to said shaft to vary the effective movement of said cylinders on said toggle member.

2. A gas valve for automatically switching compressed gas sources relative to a gas supply line comprising first and second gas inlet lines connected to said supply lines, valve means for controlling the flow of gas through said inlet lines, valve actuating means connected to said valve means, said valve actuating means being connected to said inlet lines and controlled by the pressure of gas within said inlet lines, said valve actuating means including a toggle member spring urged to an off-center position, fluid cylinders connected to said gas inlet lines, means connecting said fluid cylinders to said toggle member for shifting the same, a pin carried by said toggle member, means connecting said fluid cylinders to said pin, a shaft, said toggle member being pivotally mounted on said shaft, means carried by said toggle member for shifting said pin relative to said shaft to vary the effective movement of said cylinder on said toggle member, said last mentioned means including gearing controlled by rotation of said shaft and connected to said pin.

3. A gas valve for automatically switching compressed gas sources relative to a gas supply line comprising first and second gas inlet lines connected to said supply line, check valves in said gas inlet lines immediately adjacent their connections to said supply line, shut-off valves in said inlet lines remote from said check valves, valve actuating means for automatically operating said shut-off valves in response to the reduction of pressure in one of said inlet lines below a predetermined pressure, said valve actuating means including a valve actuating member, an overriding spring, a toggle member connected to said valve actuating member by said overriding spring, fluid cylinders controlled by gas pressures in said inlet lines, pitmans operatively connected to said toggle member, said fluid cylinders being drivingly connected to said pitmans.

4. A gas valve for automatically switching compressed gas sources relative to a gas supply line comprising first and second gas inlet lines connected to said supply line, check valves in said gas inlet lines immediately adjacent their connections to said supply line, shut-off valves in said inlet lines remote from said check valves, valve actuating means for automatically operating said shut-off valves in response to the reduction of pressure in one of said inlet lines below a predetermined pressure, said valve actuating means including a valve actuating member, an overriding spring, a toggle member connected to said valve actuating member by said overriding spring, fluid cylinders controlled by gas pressures in said inlet lines, links connected to said toggle member, pitmans operatively connected to said toggle member by said links, said fluid cylinders being drivingly connected to said pitmans, said links being formed of pivotally connected sections so as to be breakable and permit the rotation of one of said pitmans relative to the other of said pitmans.

5. A gas valve for automatically switching compressed gas sources relative to a gas supply line comprising first and second gas inlet lines connected to said supply line, check valves in said gas inlet lines immediately adjacent their connections to said supply line, shut-off valves in said inlet lines remote from said check valves, valve actuating means for automatically operating said shut-off valves in response to the reduction of pressure in one of said inlet lines below a predetermined pressure, said valve actuating means including a valve actuating member, an overriding spring, a toggle member connected to said valve actuating member by said overriding spring, fluid cylinders controlled by gas pressures in said inlet lines, pitmans operatively connected to said toggle member, said fluid cylinders being drivingly connected to said pitmans, said fluid cylinders being connected to said inlet lines intermediate their respective check valve and shut-off valve, a vent valve in each inlet line intermediate its check valve and shut-off valve to permit exhausting of an associated fluid cylinder.

6. A gas valve for automatically switching compressed gas sources relative to a gas supply line comprising first and second gas inlet lines connected to said supply line, check valves in said gas inlet lines immediately adjacent their connections to said supply line, shut-off valves in said inlet lines remote from said check valves, valve actuating means for automatically operating said shut-off valves in response to the reduction of pressure in one of said inlet lines below a predetermined pressure, said valve actuating means including a valve actuating member, an overriding spring, a toggle member connected to said valve actuating member by said overriding spring, fluid cylinders controlled by gas pressures in said inlet lines, pitmans operatively connected to said toggle member, said fluid cylinders being drivingly connected to said pitmans, said fluid cylinders being connected to said inlet lines intermediate their respective check valve and shut-off valve, a vent valve in each inlet line intermediate its check valve and shut-off valve to permit exhausting of an associated fluid cylinder, said vent valves being connected to said valve actuating member for actuation thereby in directions opposite to their respective shut-off valves.

References Cited in the file of this patent

UNITED STATES PATENTS

| | | |
|---|---|---|
| 2,234,325 | St. Clair | Mar. 11, 1941 |
| 2,334,977 | Wolfe | Nov. 23, 1943 |
| 2,389,667 | Hudson | Nov. 27, 1945 |